United States Patent [19]

Large et al.

[11] Patent Number: 5,100,083

[45] Date of Patent: Mar. 31, 1992

[54] RETRACTABLE LANDING GEAR WITH SELF-BRACED FOLDING STRUT

[75] Inventors: David T. Large; Gerrit N. Veenstra, both of Everett, Wash.

[73] Assignee: The Boeing Company, Seattle, Wash.

[21] Appl. No.: 479,516

[22] Filed: Feb. 13, 1990

[51] Int. Cl.⁵ .............................................. B64C 25/10
[52] U.S. Cl. .......................... 244/102 SS; 244/102 R; 244/102 SL
[58] Field of Search ........ 244/102 R, 102 SS, 102 SL

[56] References Cited

U.S. PATENT DOCUMENTS

| | | | |
|---|---|---|---|
| 2,049,066 | 7/1936 | Kindelberger et al. | 244/102 R |
| 2,109,427 | 2/1938 | Levy | 244/102 R |
| 2,156,773 | 5/1939 | Sikorsky | 244/102 R |
| 2,308,573 | 1/1943 | Thornhill | 244/102 R |
| 2,690,887 | 10/1954 | Perdue | 244/102 R |
| 3,511,456 | 5/1970 | Fehring et al. | 244/102 R |
| 3,687,400 | 8/1972 | Fitzgerald et al. | 244/102 R |
| 4,720,063 | 1/1988 | James et al. | 244/102 R |
| 4,907,761 | 3/1990 | Derrien et al. | 244/102 R |

FOREIGN PATENT DOCUMENTS

| | | | |
|---|---|---|---|
| 567797 | 12/1932 | Fed. Rep. of Germany | 244/102 R |
| 707350 | 5/1941 | Fed. Rep. of Germany | 244/102 R |
| 531750 | 1/1941 | United Kingdom | 244/102 R |
| 674237 | 6/1952 | United Kingdom | 244/102 R |

Primary Examiner—Joseph F. Peters, Jr.
Assistant Examiner—Anne E. Bidwell
Attorney, Agent, or Firm—Glenn D. Bellamy

[57] ABSTRACT

A folding strut having upper and lower portions (14, 16/62, 64) are connected together by a pivotal joint (18, 66, 68) for folding movement relative to one another upon extension and retraction of the strut. The upper portion (14, 62) of the strut is pivotally mounted to the aircraft frame (52, 80). A locking brace (42, 44/84, 86) extends between the upper and lower strut portions (14, 16/62, 64) to brace the strut against folding. The upper and lower portions of the strut are axially aligned (C, F) when the strut is in a fully-deployed position and the locking brace (42, 44/84, 86) maintains the strut portions (14, 16/62, 64) in this axially-aligned position. The locking brace (42, 44/84, 86) is releasable to allow relative folding movement of the upper and lower portions (14, 16/62, 64) for retraction of the strut to a stowed position. An actuation/locking mechanism (106) is provided to maintain folding members (42, 44/84, 86) of the locking brace in an axially-aligned, locked position and to displace members (42, 44/84, 86) of the locking brace from the axially-aligned position for retraction of the gear (10, 12).

21 Claims, 12 Drawing Sheets

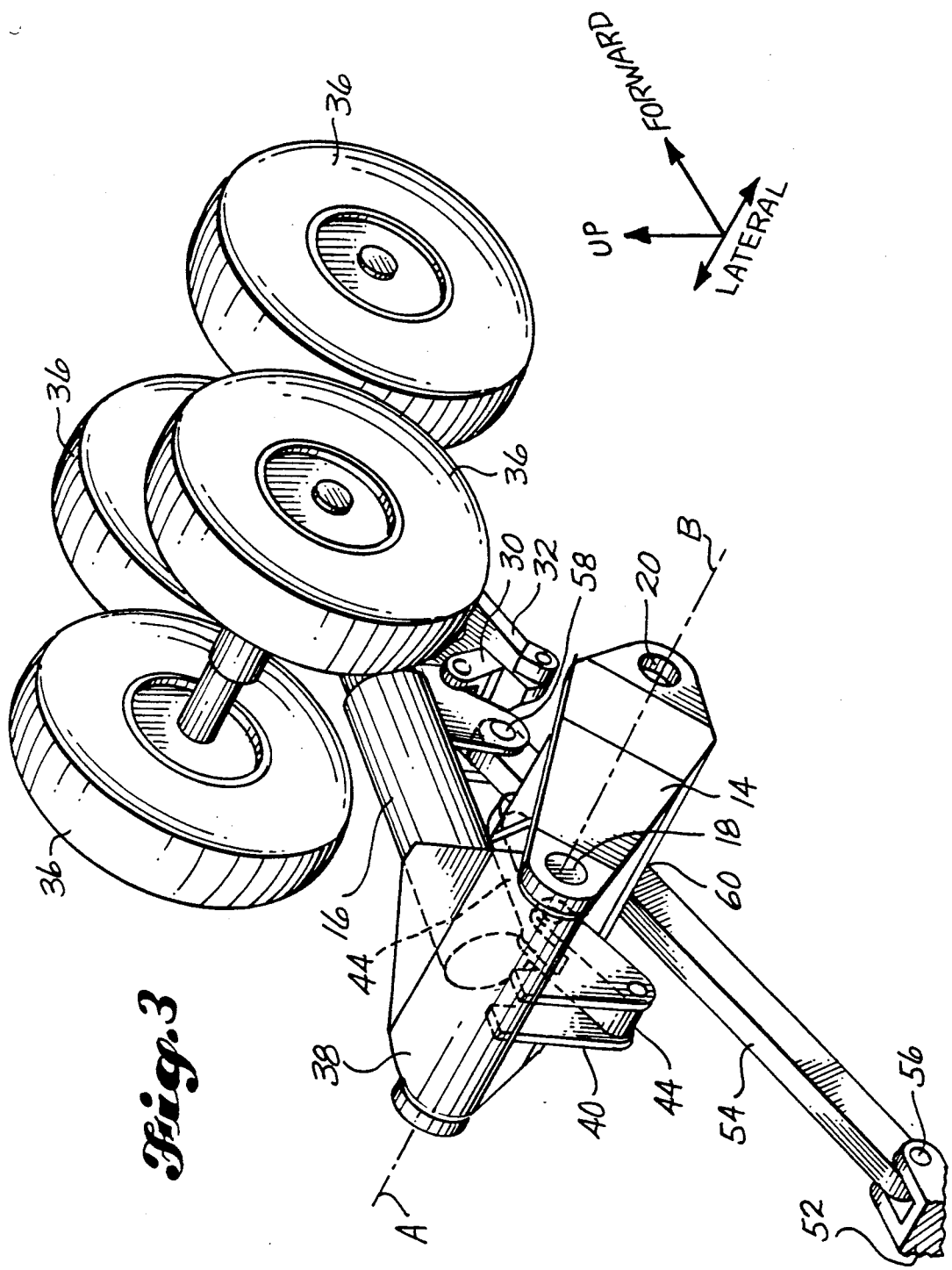

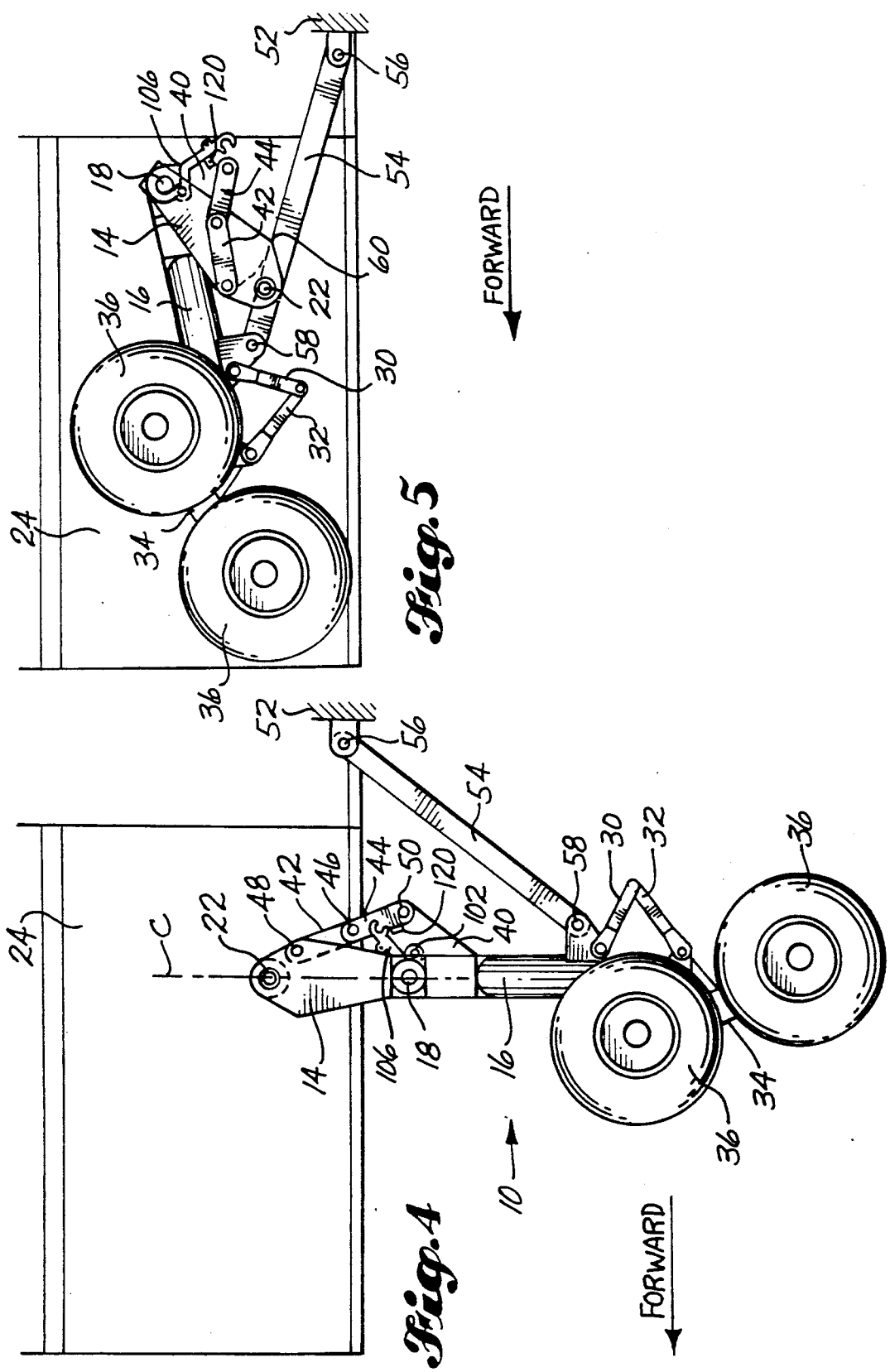

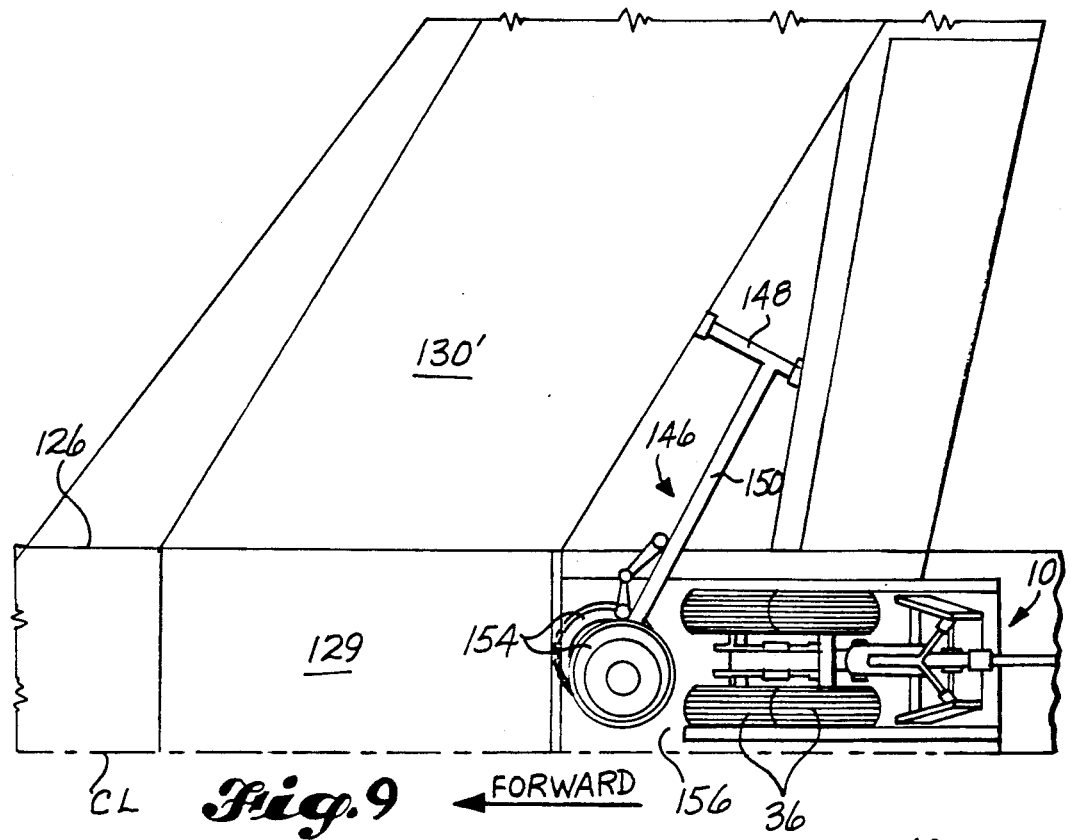
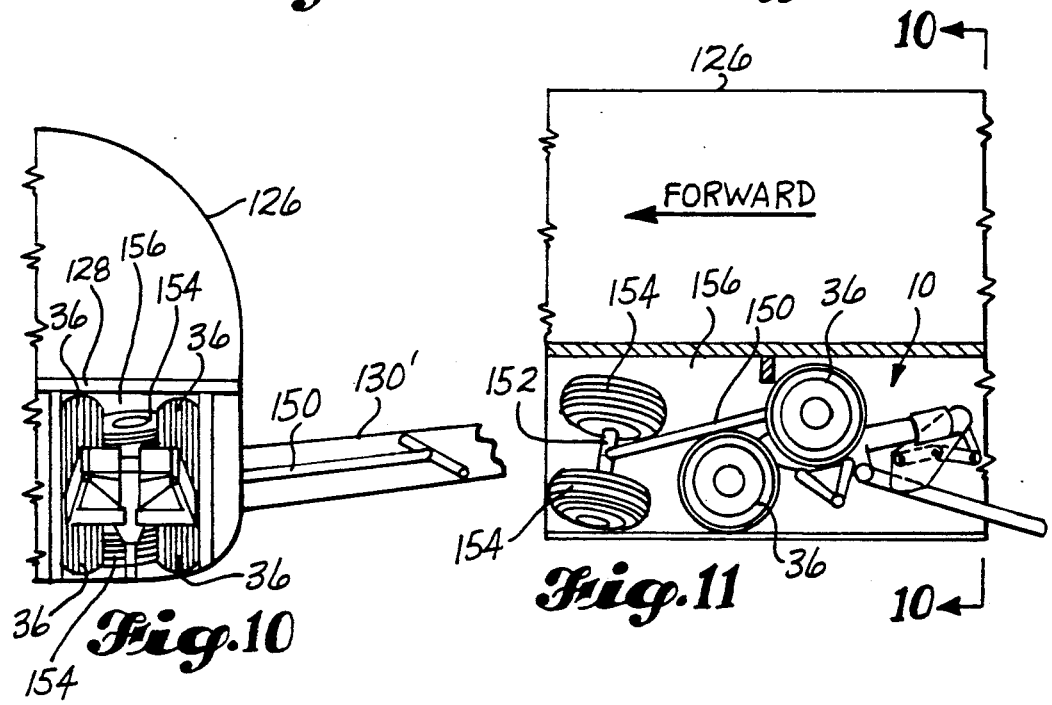

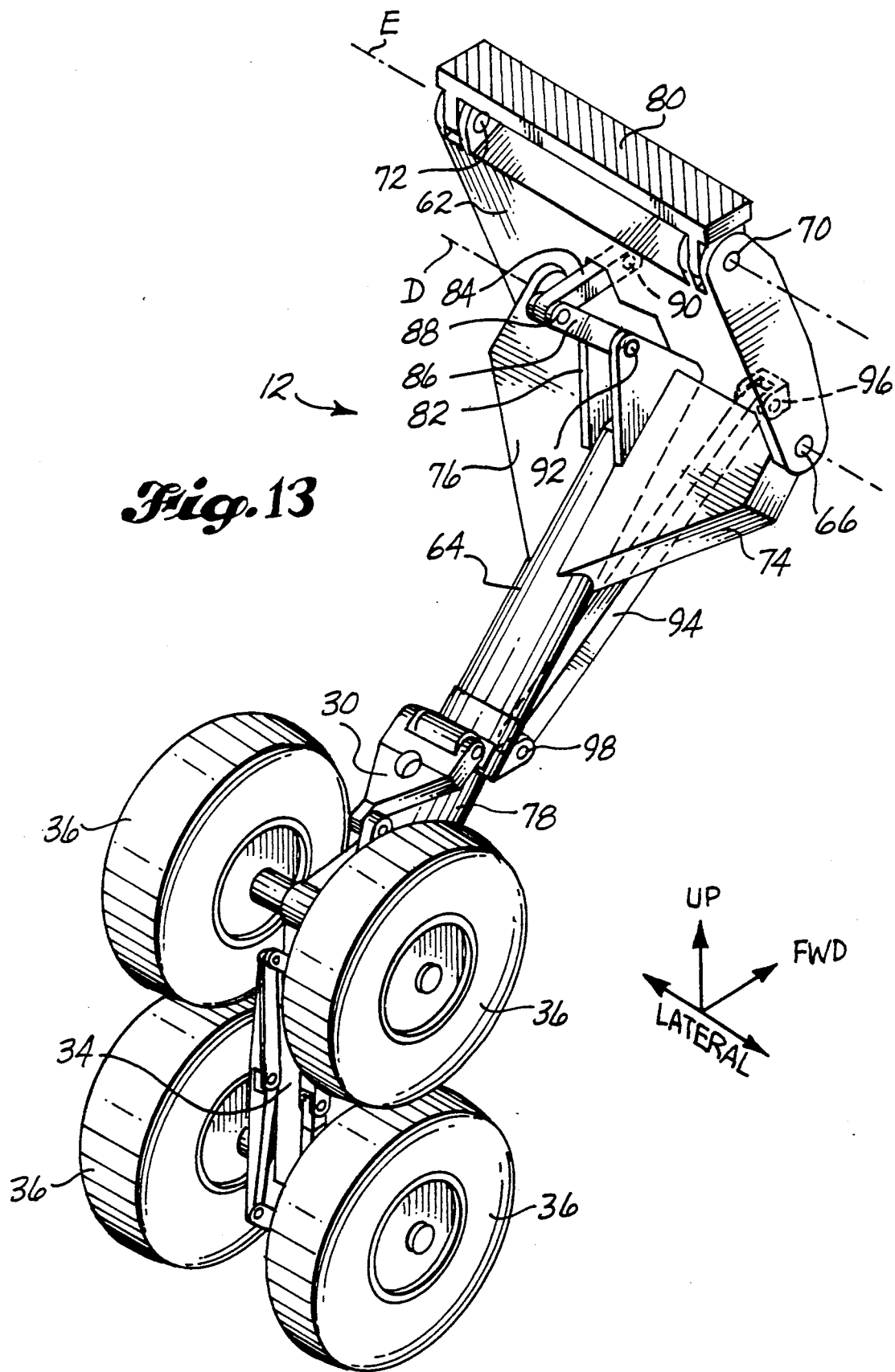

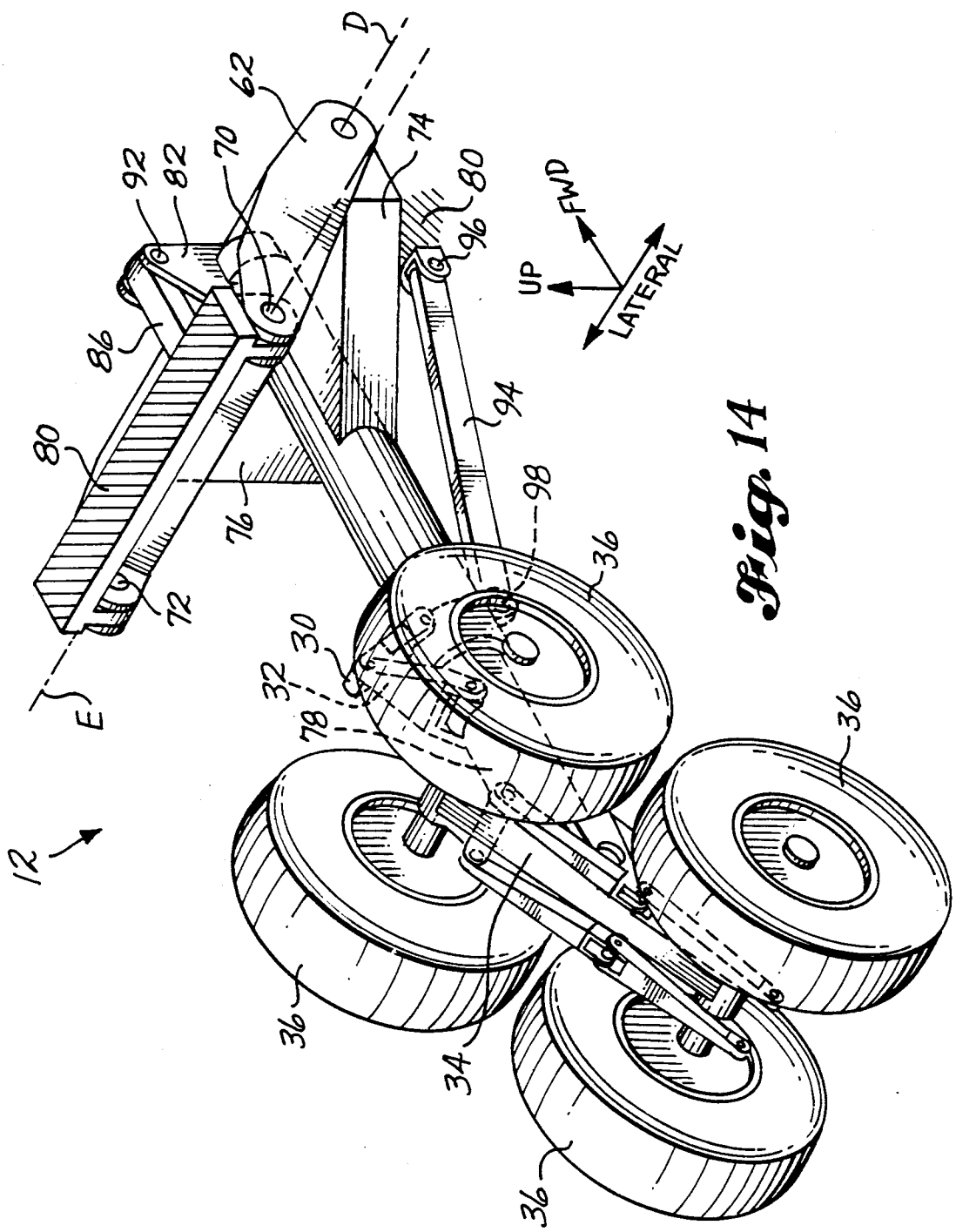

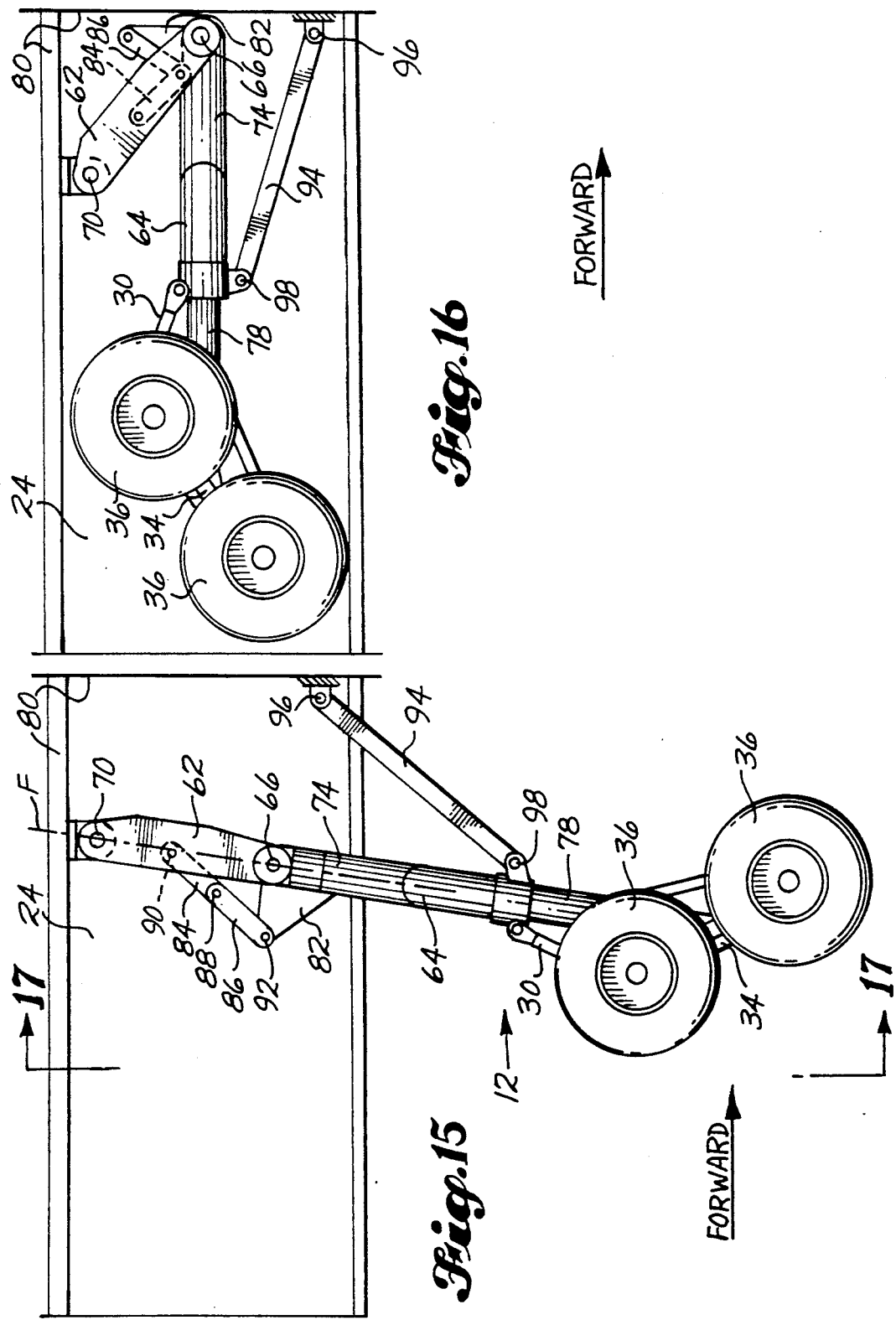

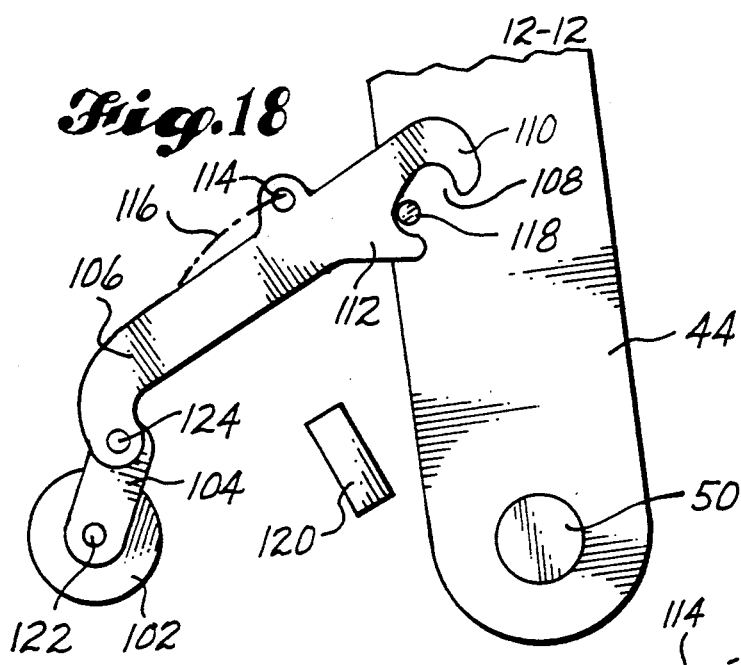
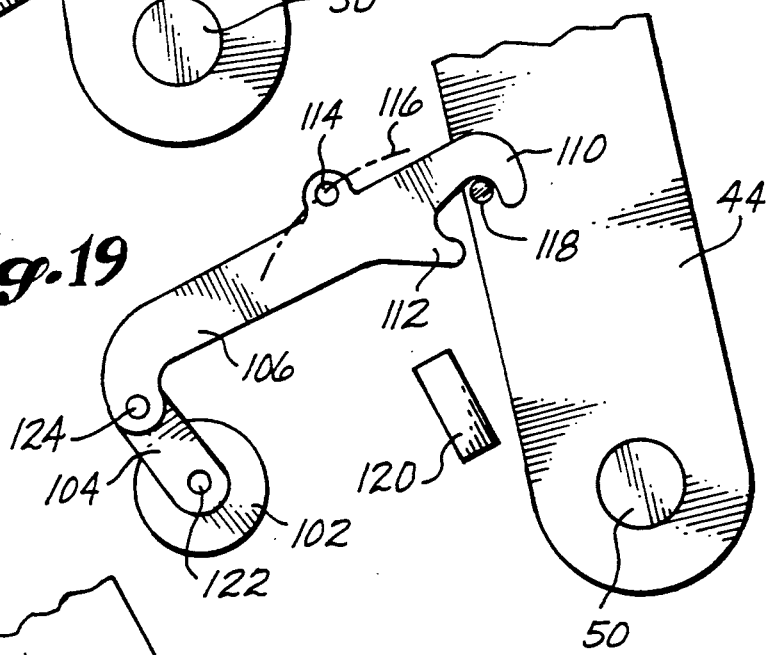
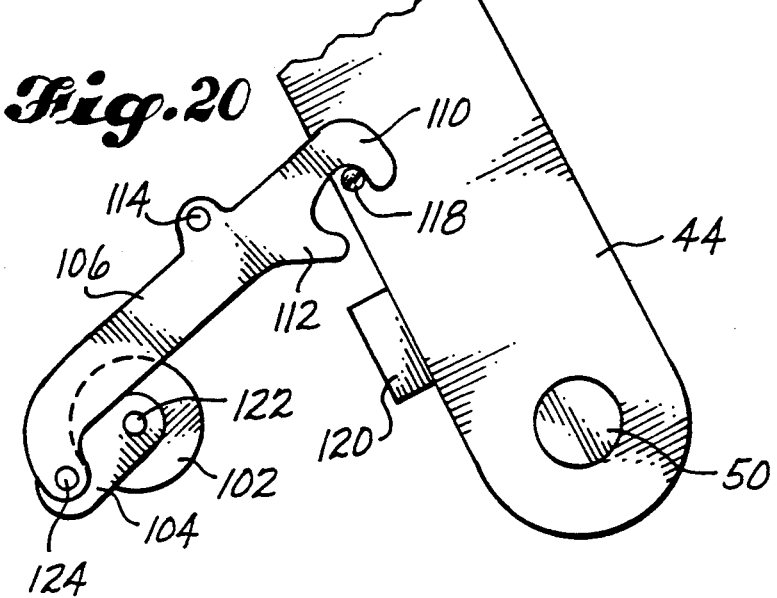

5,100,083

RETRACTABLE LANDING GEAR WITH SELF-BRACED FOLDING STRUT

DESCRIPTION

1. Technical Field

This invention relates to a retractable landing gear having a folding strut which is stowable in a compact space directly above or directly below the strut's pivotal mounting to the aircraft.

2. Background Art

The design of landing gear for modern commercial aircraft is highly dependent upon load distribution, stowage space, stowage proximity, and the ability of gear kinematics to transfer the gear between stowed and deployed positions. Commonly, the main landing gear for intermediate-size commercial aircraft are wing-mounted and body-stowed. As gross weights of such aircraft are increased to as much as 570,000 pounds, the load on landing gear has substantially increased resulting in the need for more gear posts and/or tires to meet reasonable load distribution standards. Increasing the capacity of wing-mounted gear is often complicated by the concurrent increase in wing sweep of up to five additional degrees, one of the current trends in aircraft.

Previously, the addition of one or more body gears which retract forward or aft of the deployed gear would result in an undesirable sacrifice of cargo space within the body of the aircraft. Prior attempts to "jack knife" a landing gear strut, in an attempt to fit the gear into longitudinally shorter stowage space, have resulted in a net space penalty in order to accomplish the jack-knifing and to accommodate the deployment and locking of a brace link necessary to maintain the strut in a fully-extended position. These space penalties resulted primarily because brace members were attached to adjacent fixed structure of the aircraft body, severely limiting the useful range of gear kinematics.

U.S. Pat. No. 2,308,573, issued Jan. 19, 1943, to P. W. Thornhill, shows a jack-knifing, retractable landing gear having an actuating brace member which extends between an upper portion of the strut and the aircraft body. U.S. Pat. No. 2,049,066, issued July 28, 1936, to J. H. Kindelberger et al., shows a partly-retractable landing gear in which an upper portion of the main strut is latched in place to the aircraft frame at a location on the upper member. The lower portion of the jack-knifing strut is not fixed in position relative to the upper member, but rather is pivotally movable for accomplishing the shock-absorbing function of the gear. The kinematic arrangment of the gear shown in either of these patents limits their use to relatively short downward extensions of the gear. If the struts were significantly lengthened, the gear kinematics would become either unusable or usable only at significant sacrifice of stowage space. These space penalties result primarily because brace members are attached to adjacent fixed structure of the aircraft body.

One solution proposed to overcome this kinematic limitation includes the use of a folding drag brace, as shown in U.S. Pat. No. 4,720,063, issued Jan. 19, 1988, to M. E. James et al. However, because the brace member disclosed by James et al. extends between the strut and the aircraft body, gear kinematics require that the strut be mounted relatively high in the stowage compartment and limit the retracted position of the folded strut to a position below its pivotal attachment to the aircraft.

SUMMARY OF THE INVENTION

The present invention provides a retractable aircraft landing gear having a folding strut with first and second portions pivotally jointed for relative movement upon extension and retraction of the strut. The first portion is pivotally mounted to the aircraft and a locking brace extends between the first and second portions. The first and second portions are axially aligned when the strut is in a fully-deployed position. The locking brace maintains the first and second portions in this axially-aligned position and is releasable to allow the relative folding movement of the first and second portions for retraction of the strut. A ground-contacting wheel assembly is pivotally mounted to the second portion of the strut.

The locking brace may include jointed members which are latched in an axially-aligned position and which, when displaced from their axial alignment, will fold to allow relative folding movement of the strut.

The pivotal connection between the strut's first portion and the aircraft may be in the form of transversely spaced-apart mounts positioned to carry both vertical and side loads. A drag brace may be pivotally attached between the aircraft body and the strut's second portion. The drag brace is of a fixed length and, because of the unique kinematic arrangement of the folding strut and locking brace, is not required to fold upon retraction of the gear.

The presently-disclosed retractable landing gear may be used either as a main gear or as a steerable nose gear. Because the gear of the present invention stows in a space which is relatively short in the longitudinal direction of the aircraft, it may be used in combination with typical wing-mounted, body-stowed gear in a manner which allows compact stowage of both gear and favorable load distribution when deployed. Wing gear may be stowed outboard, forward, or aft of the disclosed body gear.

The pivotal mount between the strut's first member and the aircraft body may be positioned relatively low or relatively high in the aircraft body. Either such mounting allows substantially directly overhead retraction of the gear. The low-mounted strut positions the second portion of the strut above the pivot for stowage and the high-mounted strut positions the second portion of the strut below the pivot for stowage.

Other aspects and features of the present invention will become apparent upon inspection of the accompanying drawings, detailed description of the best mode for carrying out the invention, and appended claims, each of which are incorporated herein as part of the disclosure of the present invention.

BRIEF DESCRIPTION OF THE DRAWINGS

Like reference numerals are used to indicate like parts throughout the various figures of the drawings, wherein:

FIG. 3 is a pictorial view of the gear shown in FIGS. 1 and 2 in a fully-retracted position;

FIG. 4 is a side view of the low-mounted gear shown in FIG. 1 in a fully-deployed position;

FIG. 5 is a side view of the gear shown in FIG. 4 in a fully-stowed position;

FIG. 9 is a fragmentary top view of a landing gear according to the present invention in a stowed position and relative stowed position of a wing-mounted, body-stowed gear;

FIG. 10 is a cross-sectional rear view showing the relative stowed positions of the gear shown in FIG. 9 and taken substantially along line 10—10 of FIG. 11;

FIG. 11 is a side view of the relative stowed positions of the gear shown in FIGS. 9 and 10;

FIG. 13 is a pictorial view of the gear shown in FIG. 12 in a partially-retracted position;

FIG. 14 is a pictorial view of the gear shown in FIGS. 12 and 7 in a fully-retracted position;

FIG. 15 is a side view of the high-mounted gear shown in a fully-deployed position;

FIG. 16 is a side view of the gear shown in FIG. 15 in a fully-retracted position;

FIG. 18 is a side view of a brace link actuator/locking mechanism shown in an unlocked/pushing mode;

FIG. 19 is a side view of the actuator/locking mechanism shown in a partially-locked position; and FIG. 20 is a side view of the actuator/locking mechanism shown in the locked position.

BEST MODE FOR CARRYING OUT THE INVENTION

Figure 1:
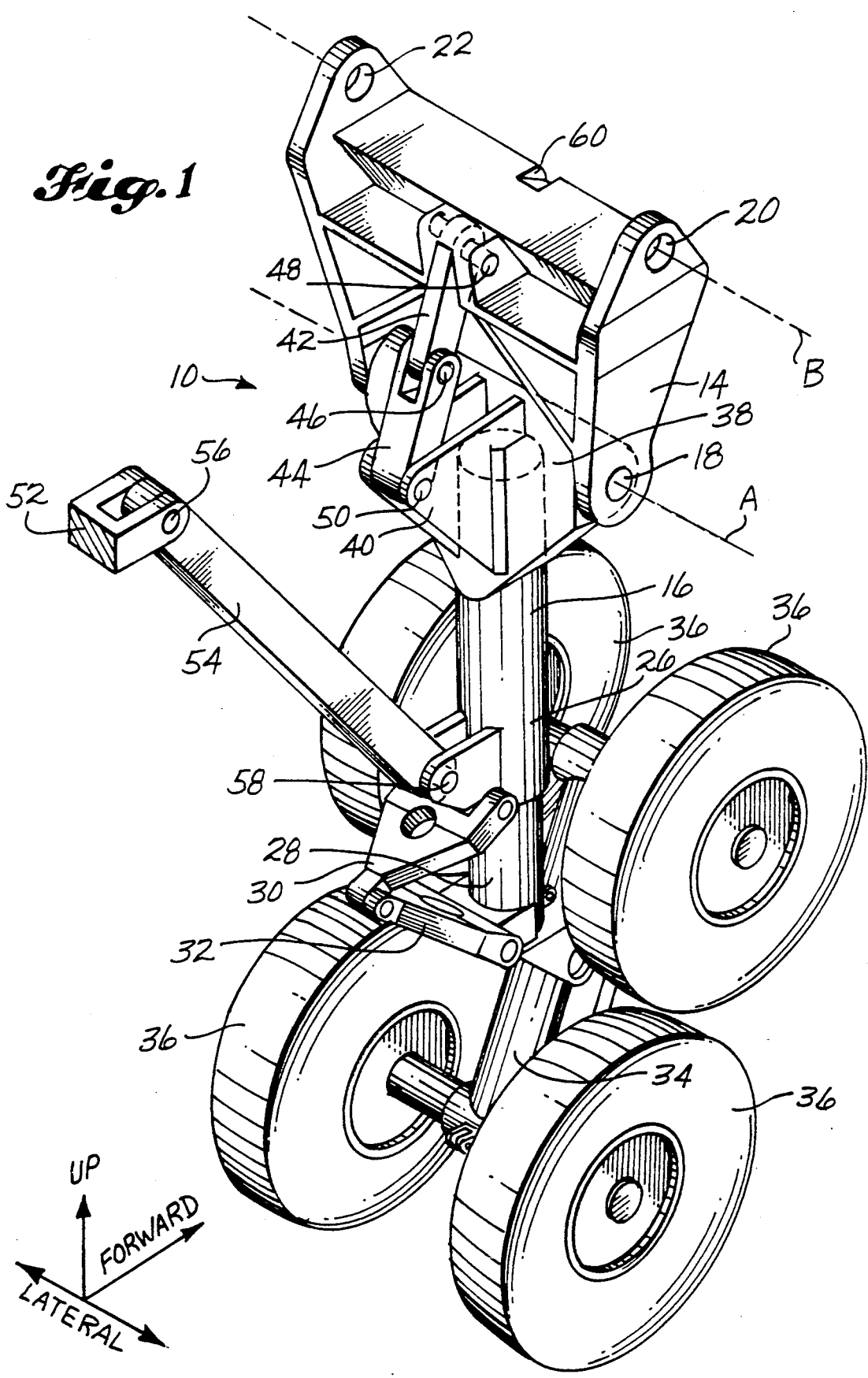
FIG. 1 is a pictorial view of a landing gear according to the preferred embodiment of the invention, having a low-mounted pivot trunnion, and shown in the fully-deployed position.

Referring to the various figures of the drawing, and first to FIGS. 1-5, therein is shown a main landing gear 10 according to a first preferred embodiment of the invention. Referring generally to FIGS. 12-16, therein is shown at 12 a second preferred embodiment of the invention. While each of these embodiments is contemplated within the scope of the present invention, the significant difference between the two embodiments can most easily be observed by a comparison of FIGS. 4 and 15. In the first embodiment, the gear 10 is mounted relatively low in the gear bay of the aircraft. In the second embodiment, the gear 12 is mounted relatively high in the gear bay of the aircraft. Other significant differences will become apparent upon examination of the detailed description of each of these embodiments which follows.

LOW-MOUNT FOLDING STRUT

Referring first to FIGS. 1 and 4, the first embodiment of a retractable landing gear 10 includes a folding strut comprising two members 14, 16 hinged together 18 along a transverse axis A for folding movement of the members 14, 16 relative to one another. The upper strut member 14 is pivotally mounted 20, 22 to the aircraft frame at a relatively low position in the landing gear bay 24 for pivotal movement around a transverse axis B. At the fully-deployed or fully-extended position, the two strut members 14, 16 are substantially in axial alignment, represented by line C.

The upper strut member 14 may be in the form of a multiple member truss and may be aptly termed a "trapeze". The lower end of upper strut member 14 is pivotally connected 18 to the upper end of lower strut member 16 for pivotal movement about axis A. Axis B is a fixed axis whereas axis A moves in position, as will hereinafter be described.

The lower strut member 16 includes a transverse trunnion 38 at its upper end to provide the pivotal connection 18 between upper and lower strut members 14, 16. This transverse trunnion 38, in combination with the transversely-widened trapeze configuration of the upper strut member 14, will carry vertical and side loads placed on the landing gear while in the fully-deployed position, shown in FIGS. 1 and 4.

The lower strut member 16 is what is commonly referred to as an "oleo" strut. It comprises upper and lower telescopic members 26, 28 connected together by torque arms 30, 32, in a known manner. An oleo strut is in the nature of a shock absorber. As is well-known per se, it comprises a shock-absorbing spring means which tends to bias the lower telescoping member 28 outwardly from the upper part 26. When the weight of the aircraft is setting on the landing gear 10, the telescoping part 28 is moved relatively upwardly into strut part 26. However, following a take-off, when the weight of the aircraft is relieved from the landing gear 10, the shock-absorbing mechanism within the members 26, 28 moves the lower part 28 outwardly relative to the upper strut part 26. The torque arms 30, 32 couple the members 26, 28 together so that one will not rotate relative to the other during the in-and-out telescopic movement and during ground turning movement of the aircraft while taxing on the ground.

The midportion of an axle beam 34 is pivotally connected to the lower telescopic member 28 of the lower strut member 16 for pivotal movement about an axis substantially parallel to axis A, between upper and lower strut members 14, 16, and axis B, the connection between upper strut member 14 and the aircraft frame. A set of four wheels 36 are mounted for rotation onto the opposite end portions of the axle beam 34 in a dual tandem arrangement. An actuator (not shown) is used to position the wheel assembly, comprised of the axle beam 34 and wheels 36, relative to the lower strut member 16 in a commonly-known manner.

Extending aftly, substantially perpendicular to the transverse trunnion 38 and lower strut member 16, is a brace flange 40. Extending between the brace flange 40 and upper strut member 14 is a folding brace linkage comprising first and second members 42, 44 pivotally attached together at a central location 46 and pivotally attached 48, 50 at opposite ends to the upper strut member 14 and brace flange 40, respectively. When the landing gear 10 is in its fully-deployed position, the first and second members 42, 44 of the locking brace are longitudinally aligned on dead center. In this position, the upper and lower strut members 14, 16 are locked against relative folding movement about axis A. While in this fully-deployed, locked position, the upper and lower strut members 14, 16 act mechanically as a unitary strut member.

Extending between the aircraft frame 52 and the lower strut member 16 is a drag brace 54. The drag brace 54 is pivotally connected 56, 58 at opposite ends and maintains a fixed length during use, during extension and/or retraction, and during stowage. The drag brace 54 is positioned to carry forward and aft drag loads placed on the gear 10.

Retraction of the gear 10 is accomplished by displacement of the folding brace linkage, moving the first and second members 42, 44 off of axial dead-center alignment. The members 42, 44 fold together by radially outward movement of the central joint 46 away from the axis of rotation A between upper and lower strut members 14, 16. Release of the locking brace 42, 44 allows the upper and lower strut members 14, 16 to fold relative to one another at their pivotal connection 18. This folding movement brings the aft sides of the strut members 14, 16 toward each other and toward the aft-mounted drag brace 54. In this manner, the strut members 14, 16 may be said to fold "toward" the drag brace.

Gear actuation may be accomplished by a rotary actuator (not shown) to initiate rotation of the upper strut member 14 for movement around fixed axis B. Alternatively, a linear hydraulic actuator (not shown) may be employed to power movement of the drag brace 54, swinging it upwardly around its fixed pivot 56 which is attached to the aircraft frame 52. Either type of actuator is capable of inducing full gear deployment or retraction, except for final locking or displacement of the locking brace members 42, 44. A separate actuator/locking mechanism is provided for this function which will be described in detail later.

Figure 2:
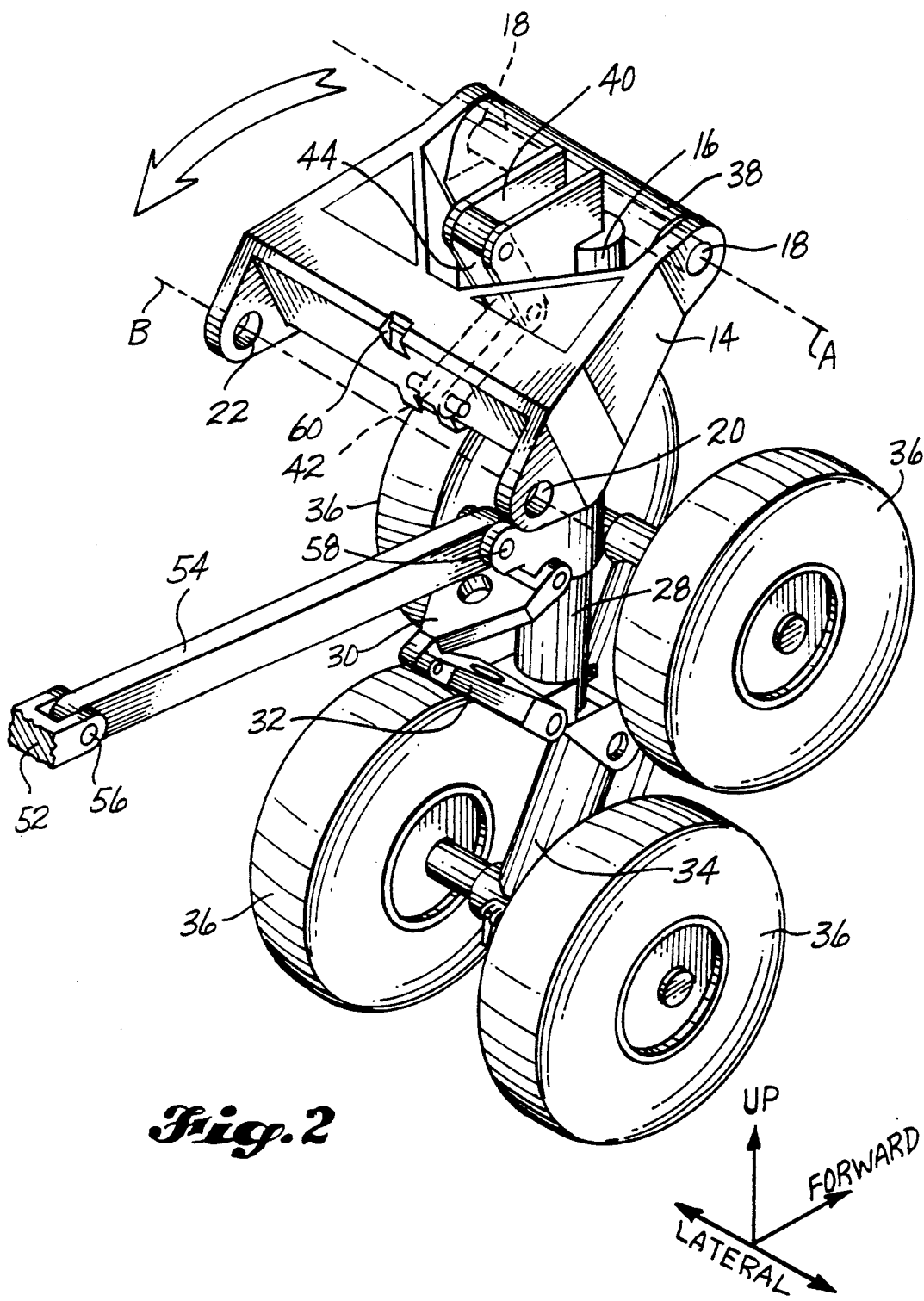
FIG. 2 is a pictorial view of the gear shown in FIG. 1 in a partially-retraced position.

Referring now also to FIGS. 2, 3, and 5, rotation of the upper strut member 14 about its fixed axis B causes relative folding movement between the upper strut member 14 and lower strut member 16. The locking brace link members 42, 44 fold in a direction opposite that of the strut members 14, 16. The drag brace 54 maintains a fixed distance between its opposite pivots 56, 58 attached to the aircraft frame 52 and lower strut member 16, respectively. During early stages of retraction, the lower strut member 16 is maintained in a substantially upright orientation, moving forward and upward relative to fixed axis B and drag brace pivot 56. This movement is one significant factor contributing to the ability of the gear 10 to retract into a compact stowage bay 24.

As the upper strut member 14 continues to rotate, the joint between it and the lower strut member 16 (axis A) is moved upwardly over the pivotal connection 20, 22 between the upper strut member 14 and aircraft frame (axis B). This action is indicated by a movement arrow shown in FIG. 2.

As axis A is moved in an aft direction over axis B, the drag brace 54, having reached its full horizontal extension, holds the lower end of the lower strut member 16 in a forward direction relative to the aft movement of the upper trunnion portion 38 of the strut 16. This causes the lower strut member 16 to be tilted into a generally horizontal position until the gear 10 reaches its fully-retracted position, as shown in FIGS. 3 and 5. In this position, the upper and lower strut members 14, 16 are positioned substantially above the strut's fixed pivot 20, 22 (axis B). The drag brace 54 is stowed beneath the strut 14, 16. Depending upon the particular construction of the upper strut member 14 and drag brace 54, it may be necessary to provide a clearance notch 60 in the transverse trunnion portion of the upper strut 14. The exact nature and location of such a clearance notch 60 will depend upon the particular relative size of members of the gear 10, but may easily be utilized as necessary in the general manner shown.

The relative folding and unfolding movement of the locking brace members 42, 44 during retraction or extension of the gear 10 is a double-rotating action. During early stages of retraction or deployment of the gear 10, the pivot points 48, 50 between the locking brace members 42, 44 and upper strut member 14 and brace flange 40 on lower strut member 16, respectively, are moved toward each other, continuously shortening the spacing therebetween. During an intermediate point in the retraction or deployment of the gear 10, the axis of rotation of pivots 18, 48 and 50 are aligned in a single plane, at which point pivots 48 and 50 reach their nearest proximity to one another. As the upper and lower strut members 14, 16 are moved beyond this position, pivots 48 and 50 pass and are moved apart, unfolding locking brace members 42, 44. This double-rotating action occurs upon each deployment or retraction of the gear 10. As previously described, upon initial movement from the fully-deployed position of the gear 10, the locking brace members 42, 44 fold in a direction opposite that of the upper and lower strut members 14, 16. After retraction beyond the previously-described midpoint, the fold direction of locking brace members 42, 44 is relatively congruent with the fold of upper and lower strut members 14, 16. As best viewed in FIG. 5, in the fully-retracted or stowed position of the gear 10, locking brace members 42, 44 do not reach an axially-aligned position and, therefore, do not require special displacement prior to deployment of the gear 10.

The previously-described kinematics of the gear 10 allow this uniquely-compact stowage position because the gear 10 is connected to the aircraft frame at only two fixed axes of rotation and because the locking brace which maintains the axial alignment of the upper and lower strut members 14, 16 in the fully-deployed position extends only between the upper and lower strut members 14, 16, rather than extending to the aircraft frame. The gear kinematics constitute a novel utilization of a four-bar linkage. In the fully-deployed position, two adjacent links (upper and lower strut members 14, 16) rigidly unite to make the gear 10 a strong three-point brace (drag brace pivots 56, 58 and axis B). The locking brace between upper and lower strut members 14, 16 also operates as a strong three-point brace, forming a rigid triangle between locking brace pivot points 48, 50 and axis A. This above-described embodiment is particularly suited for use as a body mounted/body stowed main landing gear using a four- or six-wheel tandem truck wheel assembly. This gear is also suitable for use as a nose gear using a two-wheel, steerable wheel assembly.

HIGH-MOUNT FOLDING STRUT

Figure 12:
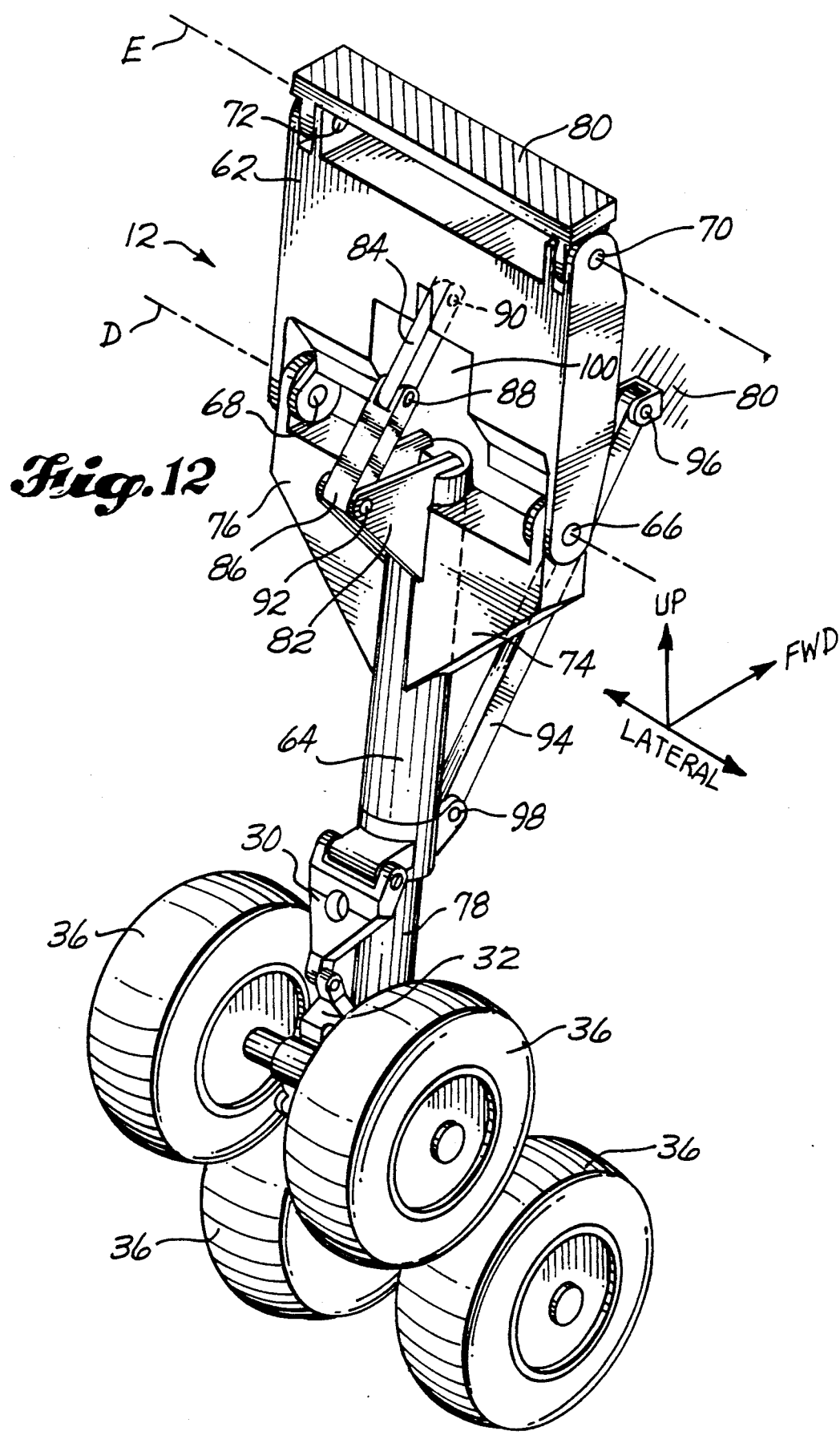
FIG. 12 is a pictorial view of the preferred embodiment of the invention, having a high-mounted trunnion pivot shown in the fully-deployed position.

Referring first to FIGS. 12 and 15, the second embodiment of a retractable landing gear 12 includes a folding strut comprising upper and lower members 62, 64 hinged together 66, 68 along a transverse axis D for folding movement of the members 62, 64 relative to one another. The upper member 62 is pivotally mounted 70, 72 to the aircraft frame at a relatively high position in the landing gear bay 24 for pivotal movement around a transverse axis E. At the fully-deployed or fully-extended position, as shown in FIGS. 12 and 15, the two members 62, 64 of the strut are substantially in axial alignment, represented by line F.

The upper member 62 may be in the form of a multiple member truss or "trapeze" having relatively wide, hinge-type pivotal connections 66, 68, 70, 72. The lower end of the upper strut member 62 is pivotally connected 66, 68 to the upper end of the lower strut member 64. The upper end of the lower strut member 64 includes a transversely-widened hinge or trunnion in the form of oppositely-extending flange portions 74, 76.

The lower strut member 64 is an oleo strut of the previously-described form. It includes a lower telescopically-extending member 78 which moves axially relative to the remainder of the lower strut member 64 in response to the weight of the aircraft on the gear 12 and contact of the wheel assembly with the ground. The two telescoping portions are coupled together by torque arms 30, 32 in the previously-described, well-known manner. At the lower end of the telescoping portion 78 is a wheel assembly which comprises an axle beam 34 and a set of four wheels 36 mounted for rotation onto opposite end portions of the axle beam 34 in a dual tandem arrangement. The midportion of the axle beam 34 is pivotally connected to the lower telescopic member 78 for pivotal movement about an axis substantially parallel to axis D, between upper and lower strut members 62, 64, and axis E, the connection between the upper strut member 62 and the aircraft frame 80. As previously described, an actuator (not shown) is used to position the wheel assembly relative to the lower strut member 64, 78 in a commonly-known manner.

Extending aftly from the lower strut member 64, substantially perpendicular to the trunnion flanges 74, 76 and longitudinal extension of the lower strut post 64, is a brace flange 82. Extending between the brace flange 82 and upper strut member 64 is a folding brace linkage comprising first and second members 84, 86 pivotally attached together at a central location 88 and pivotally attached 90, 92 at opposite ends to the upper strut member 62 and brace flange 82, respectively. When the landing gear 12 is in its fully-deployed position, the brace members 84, 86 of the locking brace are longitudinally aligned on dead center. In this position, the upper and lower strut members 62, 64 are locked against relative folding movement about axis D. While in this fully-deployed, locked position, the upper and lower strut members 62, 64 act mechanically as a unitary strut member.

Forward of the strut 62, 64, extending between the aircraft frame 80 and the lower strut member 64, is a drag brace 94. The drag brace 94 is pivotally connected 96, 98 at opposite ends and maintains a fixed length between these pivot points 96, 98 at all times. The drag brace 94 is positioned forward of the main strut 62, 64 and carries forward and aft drag loads placed on the gear 12.

Retraction of the gear 12 may be accomplished in a manner similar to that previously described with regard to the first embodiment 10. Generally, the folding brace link members 84, 86 are first displaced outwardly off of axial dead center alignment. Release of the locking brace members 84, 86 allows the upper and lower strut members 62, 64 to fold relative to one another at the pivotal connections 66, 68 along axis of rotation D. Because the folding movement of strut members 62, 64 is the same as that in the previously-described embodiment 10 relative to the aircraft body, but the drag brace 94 is forwardly mounted, the folding of the strut members 62, 64 may be said to be "away" from the drag brace 94.

As previously described, gear actuation may be accomplished by a rotary actuator (not shown) to initiate rotation of the upper strut member 62 for movement around its pivotal attachment 70, 72 (axis E) to the aircraft frame 80. Alternatively, a linear hydraulic actuator (not shown) may be employed to power movement of the drag brace 94, swinging it upwardly around its fixed pivot end 96. Either type of actuation is capable of accomplishing full gear deployment or retraction, except for final locking or displacement of the locking brace members 84, 86. A separate actuator/locking mechanism operable to perform this function on this and the previously-described embodiment will be described in detail later.

Referring now also to FIGS. 13, 14 and 16, retraction of the gear 12 from the fully-deployed position shown in FIGS. 12 and 15 is accomplished by rotation of the upper strut member 62 about its fixed axis E, causing relative folding movement between the upper and lower strut members 62, 64. The locking brace link members 84, 86 fold in a direction opposite that of the strut members 62, 64. The drag brace 94 maintains a fixed distance between its opposite pivots 96, 98 attached to the aircraft frame 80 and lower strut member 64, respectively. The main beam 34 of the wheel assembly is positioned substantially as shown to fit into a compact stowage bay 24 efficiently.

As previously described, the relative folding and unfolding movement of the locking brace members 84, 86 during retraction or extension of the gear 12 is a double-rotating action. As shown in FIG. 13, as the brace member pivot point 92 on the brace flange 82 approaches the brace member pivot point 90 on the upper strut member 62, the brace members 84, 86 continue to fold. As pivot point 92 passes pivot point 90, the brace members 84, 86 begin to unfold. A converse action takes place during deployment of the gear 12. Relative folding movement of the upper and lower strut members 62, 64 continues until the gear 12 has reached its fully-stowed position, as shown in FIGS. 14 and 16. In this fully-retracted or fully-stowed position, the strut members 62, 64 are stowed substantially beneath the pivotal attachment 70, 72 of the upper strut member 62 to the aircraft frame 80.

Depending upon the particular form of the upper strut member 62 selected, an appropriate window 100 may need to be provided to allow passage of the brace flange 82 and locking brace members 84, 86 during their double-rotating movement.

This embodiment of a folding landing gear 12 allows a relatively long strut 62, 64 to be retracted into a relatively short stowage bay 24. Another advantage of this embodiment is that the aircraft frame mounting point 96 of the drag brace 94 may be included within the normal space of the stowage bay 24, thereby eliminating the need for further break in the aircraft's skin. The gear kinematics of the latter-described embodiment 12 also constitute a novel utilization of a four-bar linkage. As previously described, this embodiment also provides a strong, rigid gear structure in the fully-deployed position using similar three-point bracing mechanics.

STRUT BRACE ACTUATION/LOCKING MECHANISM

Referring specifically to FIGS. 18-20, and generally to FIGS. 4 and 5, therein is shown an actuation/locking mechanism which acts on one member of the folding brace to move it off of and hold it onto dead-center axial alignment. For purposes of example, the actuation/locking mechanism will be described as acting on the lower brace link 44 of the first embodiment 10. It is to be realized that variations in the configuration and design of this mechanism may be made as necessary and that the mechanism may be used to actuate/lock either the upper brace link 42, 84 or lower brace link 44, 86 on either of the illustrated embodiments or any other embodiment contemplated within the scope of this invention.

In preferred form, the actuation/locking mechanism includes a rotary actuator motor 102 which swings a rotating lever 104. The lever 104 is pivotally attached to one end of a latch hook 106. The opposite end of the latch hook 106 includes an open mouth notch 108 having opposite hook throats therein defined by first and second hook portions 110, 112. The latch hook 106 is guided by a guide pin 114 which is moved along an arcuate track 116 as the lever 104 of the actuation motor 102 moves the latch hook 106.

The lower brace link 44 includes a laterally-extending post 118 which is engageable in the open mouth 108 of the latch hook 106.

FIG. 20 represents the position of the actuation/locking mechanism and locking brace link 44 in the latched position. In this position, the folding brace members 42, 44 are in their axially-aligned, dead-center position. The brace members are prevented from reverse folding by a stop member 120 on the brace flange 40. The first hook portion 110 of the latch hook 106 holds the post 118, and thereby the brace member 44 firmly against the stop member 120. The latch hook is firmly locked into place by the actuation motor 102. The actuation motor 102 and lever 104 position the pivot point 124 between the lever 104 and latch hook 106 slightly beyond center relative to the pivotal axis 122 of the actuation motor 102. In this manner, the latch hook 106 is firmly locked in place, the first hook portion 110 firmly holding the lower brace member 44 in position against the stop member 120.

To release the brace members 42, 44 from their axially-aligned dead-center position, the actuation motor rotates lever 104, thereby moving the latch hook 106 along its guide track 116 and causing the second hook portion 112 of the latch hook 106 to engage and push against the post 118 on the lower brace member 44, 86. Further rotation of the actuator motor 102 causes the latch hook to push the lower brace member 44 out of axial alignment with the upper brace member 42 and away from stop member 120. Once the brace members 42, 44 have been moved from their axially-aligned position, the previously-described actuation means operating on the landing gear strut members takes over further movement. Because of the previously-described double-rotating movement of the brace members 42, 44 the latch hook 106 is not of sufficient length to follow the post 118 along its entire retraction/deployment path. Once the actuator 102 has performed its function, rotation ceases and the post 118 is free to move out of the open hook mouth 108 of the latch hook 106 (not shown).

While the gear 10, 12 is in its stowed position, the latch hook 106 waits in a ready position to receive the post 118 upon deployment of the gear 10, 12. As the gear 10, 12 approaches its fully-deployed position, the post 118 moves into the open mouth 108 of the latch hook 106 at which point the actuation motor 102 retracts the latch hook 106 to engage the post 112 in the first hook portion 110, as shown in FIG. 19. The actuation motor 102 continues to move the lever 104 and latch hook 106, pulling the lower brace member 44, 86 into its axially-aligned, dead-center position firmly in place against the stop member 120, as shown in FIG. 20. In this manner, the previously-described locking brace linkage may be used to rigidly brace the upper and lower strut members 14, 16 in axial alignment without the need for any latching mechanism extending to the aircraft frame.

Figure 6:
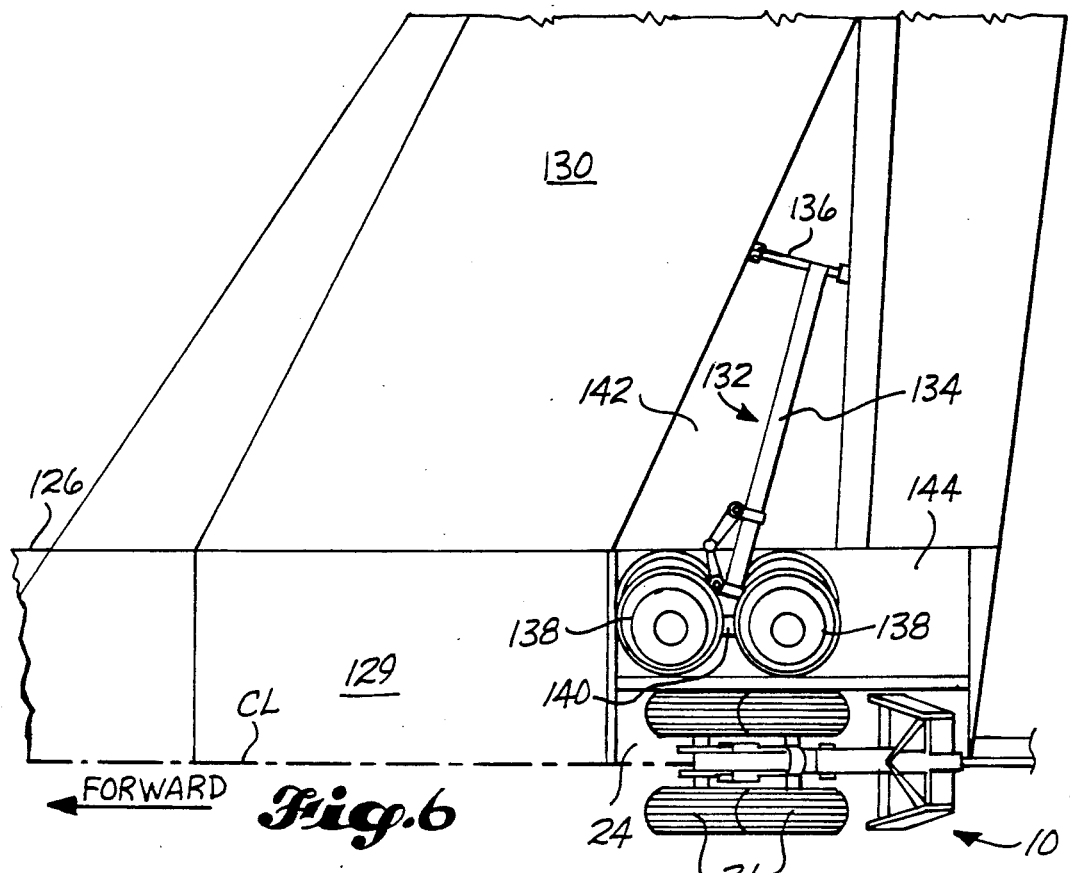
FIG. 6 is a fragmentary top view showing the landing gear of the present invention in a stowed position and relative stowed position of a wing-mounted, body-stowed gear.
Figure 7:
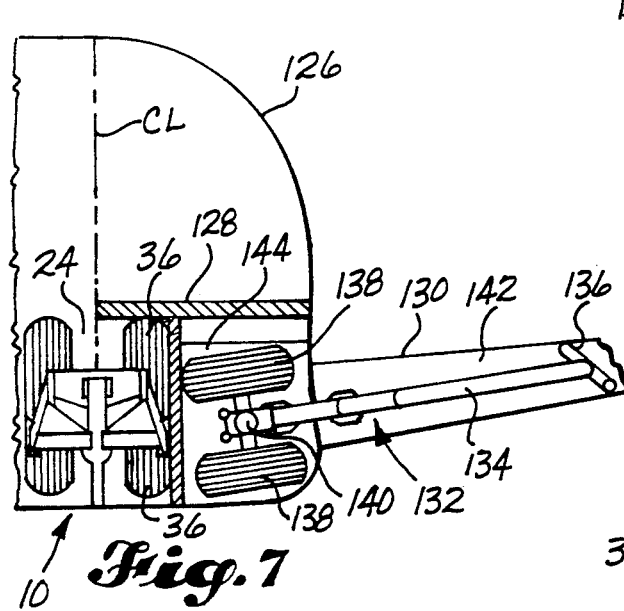
FIG. 7 is a cross-sectional rear view showing the relative stowed positions of the gear shown in FIG. 6 and taken substantially along line 7—7 of FIG. 8.
Figure 8:
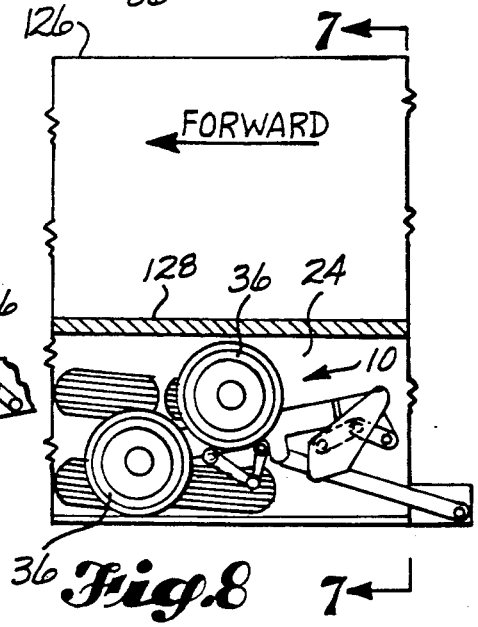
FIG. 8 is a side view showing the relative stowed positions of the gear shown in FIGS. 6 and 7.

The landing gear of the present invention may easily be adapted for use as a body-mounted/stowed main gear or nose gear. When used as a main landing gear, the present invention is particularly suited to be used in combination with body-stowed wing gear. FIGS. 6-8 show the first illustrated embodiment 10 of a landing gear axially centrally mounted within the body 126 of an aircraft. Line CL represents the axial center of the aircraft on each side of which is located symmetrical equipment. The stowage compartment 24 or gear bay is situated below the flight deck 128 and immediately aft of the wing box center section 129 in the aircraft body 126. Extending outwardly from each side of the aircraft body 126 are wings 130 which are swept back from between 30° and 33° from perpendicular relative to the longitudinal axis (CL) of the aircraft body 126.

In this illustrated application, a single, centrally-mounted body gear 10 having a four-wheel tandem truck is used in combination with a pair of wing gear 132, each also having a four-wheel tandem truck. The wing gear 132 includes a main post 134 mounted on a skewed trunnion 136. This type of wing gear construction is well known, per se. In this embodiment, the wing gear 132 includes a wheel assembly generally comprised of four wheels 138 mounted on a central beam 140. The post 134 and trunnion 136 are stowed in a wing stowage bay 142, while the more bulky wheel assembly is stowed in a body stowage compartment 144 directly outboard of the body gear stowage compartment 24. The body stowage compartment 144 for the wing gear 132 requires a relatively small longitudinal space within the aircraft body 126. In order to maximize cargo space and, thereby, minimize longitudinal space sacrifice imposed by a body-mounted gear, the gear 10 of the present invention is particularly useful.

Referring now to FIGS. 9-11, therein is shown an alternate combination of the gear 10 of the present invention in combination with a wing-mounted, body-stowed gear 146. In this illustrated combination, a pair of side-by-side body-mounted gear 10 having a four-wheeled truck wheel assembly may be employed with a wing gear 146 having a skewed trunnion 148, post 150 and single-axle 152, dual-wheeled 154 wheel assembly. The embodiment illustrated in FIGS. 9-11 show a wing 130' swept back 34° to 37°, about 4° greater than the wing 130 shown in FIGS. 6-8. In such an application, it is more practical to distribute a greater share of the increased load to body-mounted gear 10 rather than wing-mounted gear 146. In order to minimize body stowage space sacrifices, the wheel assembly of the wing gear 146 is stowed immediately forward of the body gear 10 in a common stowage compartment or bay 156.

Figure 17:
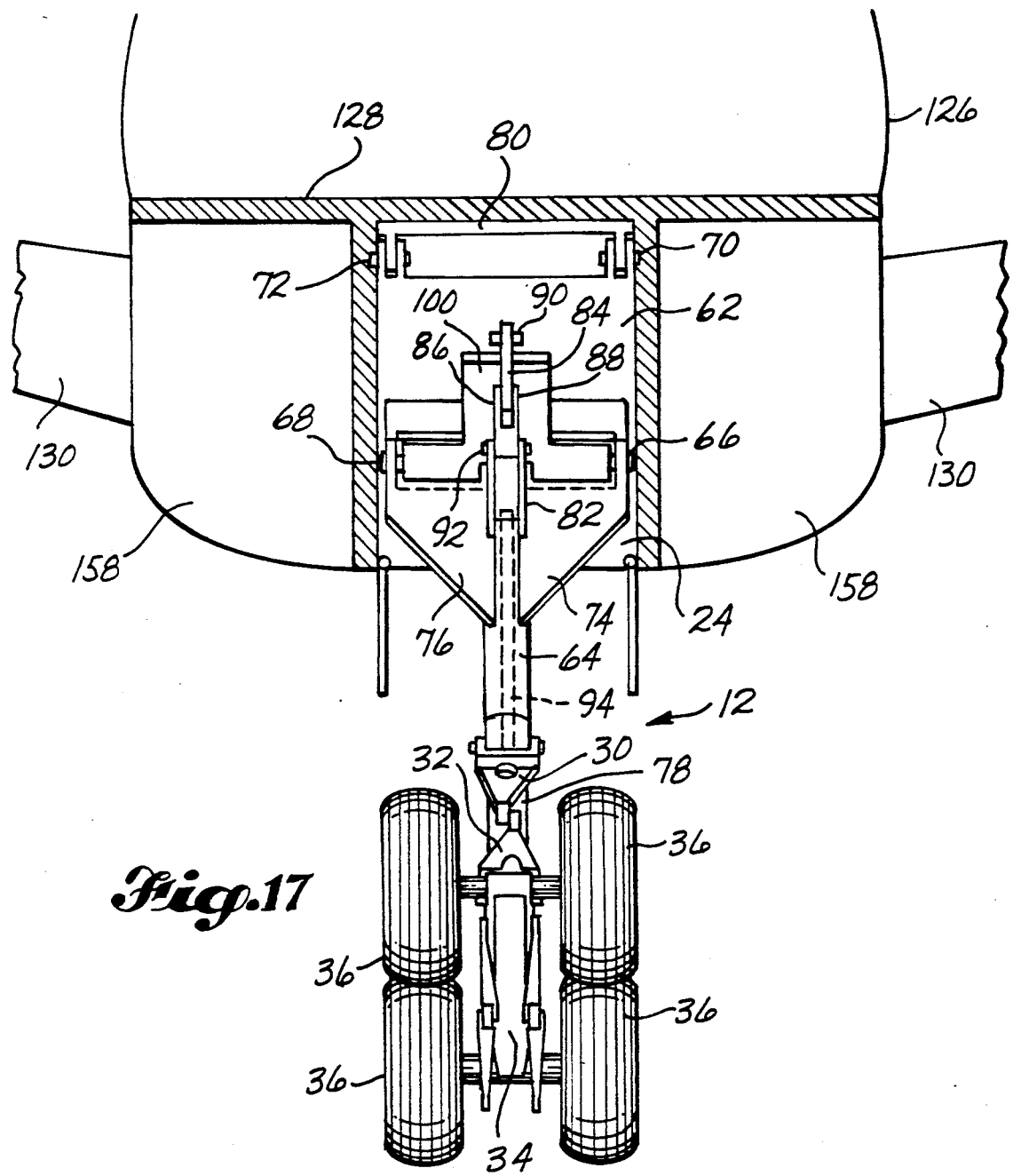
FIG. 17 is a rear view of the gear taken substantially along line 17—17 of FIG. 15.

Referring to FIG. 17, therein is shown the landing gear 12 of the present invention according to the second illustrated embodiment. The gear 12 is shown from the rear in a deployed position. In the same manner as the above-described embodiment, this body-mounted gear 12 may be used in combination with wing-mounted, body-stowed gear. The combination illustrated in FIG. 17 includes a single, centrally-mounted body gear 12 in combination with a pair of wing gear (not shown). The wing gear's wheel assembly would be stowed in compartments 158 immediately outboard of the body gear stowage compartment 24.

Neither of the above-described combinations would be practical, if possible, with prior art body-mounted gear. Prior art body gear having a non-folding, forward or aft retracting post, or even prior art landing gear having a jack-knifing strut would impose undesirable space-sacrificing consequences and/or produce unworkable load distributions.

The terminology used above is adapted for the purpose of this patent document. It is to be understood that different people and different companies in the industry use different terminology for describing parts and assemblies of the type which make up the present invention. The terminology presently used is to be construed to include similarly-functioning equipment, regardless of its description or design.

The above-described and illustrated embodiments are presented as examples only and not for purposes of limitation. Many changes in specific structure may be made in order to adapt the present invention to a particular aircraft or application without departing from the spirit and scope of the present invention. For this reason, the invention is only to be limited by the following claim or claims interpreted according to accepted rules and doctrines of claim interpretation, including the doctrine of equivalents.

What is claimed is:

1. A retractable landing gear for an aircraft, comprising:
   a folding strut having first and second portions connected by a pivotal joint for folding movement relative to one another upon extension and retraction of said strut, said first portion being pivotally mounted to said aircraft for pivotal movement relative to said aircraft upon extension and retraction of said strut;
   a brace flange extending from one of said first and second portions and having a joint location positioned radially outwardly a fixed distance from said pivotal joint;
   a locking brace extending between said joint location on said brace flange and the other one of said first and second portions; and
   a ground-contacting wheel assembly pivotally mounted to said second portion of said strut,
   said first and second strut portions being axially aligned when said strut is in a fully-deployed position, said locking brace maintaining said first and second portions in said axially-aligned position, and said locking brace being releasable to allow relative folding movement of said first and second portions for retraction of said strut to a stowed position.

2. The landing of claim 1, further comprising a drag brace extending between said aircraft and said second portion of said strut, said drag brace having a fixed length at all times.

3. The landing gear of claim 2, wherein said folding movement of said first and second portions upon retraction of said strut is toward said drag brace.

4. The landing gear of claim 2, wherein said folding movement of said first and second portions upon retraction of said strut is away from said drag brace.

5. The landing gear of claim 2, wherein said pivotal mount of said first portion to said aircraft includes transversely spaced-apart mounts positioned to carry both vertical and side loads.

6. The landing gear of claim 1, wherein said second portion includes an axially-displaceable shock-absorbing means.

7. The landing gear of claim 1, wherein said wheel assembly includes at least a pair of tandem-mounted wheels openly mounted on an elongated beam, said beam being pivotally attached to said second portion of said strut.

8. A retractable landing gear for an aircraft, comprising:
   a folding strut having first and second portions connected by a pivotal joint for folding movement relative to one another upon extension and retraction of said strut, said first portion being pivotally mounted to said aircraft;
   a locking brace extending between said first and second portions; and
   a ground-contacting wheel assembly pivotally mounted to said second portion of said strut,
   said first and second strut portions being axially aligned when said strut is in a fully-deployed position, said locking brace maintaining said first and second portions in said axially-aligned position, and said locking brace being releasable to allow relative folding movement of said first and second portions for retraction of said strut to a stowed position;
   wherein upon retraction of said strut from said fully-deployed position to a stowed position, said first portion pivots forwardly relative to said aircraft and said first and second portions fold relative to one another such that, when retracted, said seocnd portion is at least partially positioned above said pivotal mounting between said first portion and said aircraft.

9. The landing of claim 8, further comprising a drag brace extending between said aircraft and said second portion of said strut, said drag brace having a fixed length at all times.

10. The landing gear of claim 9, wherein said folding movement of said first and second portions upon retraction of said strut is toward said drag brace.

11. A retractable landing gear for an aircraft, comprising:
   a folding strut having first and second portions connected by a pivotal joint for folding movement relative to one another upon extension and retraction of said strut, said first portion being pivotally mounted to said aircraft;
   a locking brace extending between said first and second portions; and
   a ground-contacting wheel assembly pivotally mounted to said second portion of said strut,
   said first and second strut portions being axially aligned when said strut is in a fully-deployed position, said locking brace maintaining said first and second portions in said axially-aligned position, and said locking brace being releasable to allow relative folding movement of said first and second portions for retraction of said strut to a stowed position;
   wherein upon retraction of said first from said fully-deployed position to a stowed position, said first portion pivots forwardly relative to said aircraft and said first and second portions fold relative to one another such that, when retracted, said second portion is at least partially positioned below said pivotal mounting between said first portion and said aircraft.

12. The landing of claim 11, further comprising a drag brace extending between said aircraft and said second portion of said strut, said drag brace having a fixed length at all times.

13. The landing gear of claim 12, wherein said folding movement of said first and second portions upon retraction of said strut is away from said drag brace.

14. A retractable landing gear for an aircraft, comprising:
   a folding strut having first and second portions connected by a pivotal joint for folding movement relative to one another upon extension and retraction of said strut, said first portion being pivotally mounted to said aircraft;
   a locking brace extending between said first and second portions; and
   a ground-contacting wheel assembly pivotally mounted to said second portion of said strut,
   said first and second strut portions being axially aligned when said strut is in a fully-deployed position, said locking brace maintaining said first and second portions in said axially-aligned position, and said locking brace being releasable to allow relative folding movement of said first and second portions for retraction of said strut to a stowed position;
   wherein said locking brace includes first and second elongated members pivotally attached together for relative folding movement, said first member being pivotally attached to said first strut portion and said second member being pivotally attached to said second strut portion, said first and second brace members being in an axially-aligned position when said gear is in said fully-deployed position, and said first and second brace members folding relative to one another to permit said retraction of said strut.

15. The landing gear of claim 14, wherein said locking brace further includes a means for releasably latching said brace members into said axially-aligned position.

16. The landing gear of claim 15, wherein said locking brace further includes an actuating means for dislocating said brace members from said axially-aligned position.

17. The landing gear of claim 15, whereikn said latching means includes a latch hook positioned to releasably hold one of said brace members against a stop means in said axially-aligned position.

18. Th landing gear of claim 17, wherein said locking brace further includes an actuator means for dislocating said brace members from said axially-aligned position.

19. In combination, retractable main landing gear for an aircraft having a body and a wing, comprising:
   a wing-mounted, body-stowed gear; and
   a body-mounted, body-stowed gear; comprising:
   a folding strut having first and second portions connected by a pivotal joint for folding movement relative to one another upon extension and retraction of said strut, said first portion being pivotally mounted to said aircraft body for pivotal movement relative to said a aircraft body upon extension and retraction of said strut;
   a brace flange extending from one of said first and second portions and having a joint location positioned radially outwardly a fixed distance from said pivotal joint;
   a locking brace extending between said joint location on said brace flange and the other one of said first and second portions; and
   a ground-contacting wheel assembly pivotally mounted to said second portion of said strut,
   said first and second strut portions being axially aligned when said strut is in a fully-deployed position, said locking brace maintaining said first and second portions in said axially-alinged position, and said locking brace being releasable to allow relative folding movement of said first and seocnd portions for retraction of said strut to a stowed position within said body.

20. The landing gear of claim 19, wherein said wing-mounted, body-stowed gear is stowed outboard of said body-mounted, body-stowed gear.

21. The landing gear of claim 19, wherein said wing-mounted, body-stowed gear is stowed forward of said body-mounted, body-stowed gear.

* * * * *

UNITED STATES PATENT AND TRADEMARK OFFICE
CERTIFICATE OF CORRECTION

PATENT NO. : 5,100,083
DATED : March 31, 1992
INVENTOR(S) : David T. Large and Gerrit N. Veenstra It is certified that error appears in the above-identified patent and that said Letters Patent is hereby corrected as shown below:

Col. 1, line 53, "arrangment" should be -- arrangement --.

Col. 4, line 40, "taxing" should be -- taxiing --.

Claim 8, col. 12, line 38, "seocnd" should be -- second --.

Claim 11, col. 12, line 67, "retraction of said first" should be -- retraction of said strut --.

Claim 17, col. 14, line 5, "whereikn" should be -- wherein --.

Claim 18, col. 14, line 9, "Th" should be -- The --.

Claim 19, col. 14, line 21, delete "a".

Claim 19, col. 14, line 35, "axially-alinged" should be -- axially-aligned --.

Claim 19, col. 14, line 37, "seocnd" should be -- second --.

Signed and Sealed this

Twentieth Day of July, 1993

Attest:

MICHAEL K. KIRK

Attesting Officer

Acting Commissioner of Patents and Trademarks